(12) United States Patent
Awano et al.

(10) Patent No.: US 7,311,889 B2
(45) Date of Patent: Dec. 25, 2007

(54) CARBON NANOTUBES, PROCESS FOR THEIR PRODUCTION, AND CATALYST FOR PRODUCTION OF CARBON NANOTUBES

(75) Inventors: Yuji Awano, Kawasaki (JP); Yoshitaka Yamaguchi, Kawasaki (JP); Kenji Arinaga, Kawasaki (JP); Shozo Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 10/464,847

(22) Filed: Jun. 19, 2003

(65) Prior Publication Data

US 2007/0253889 A1    Nov. 1, 2007

(30) Foreign Application Priority Data

Jun. 19, 2002  (JP)  .............................. 2002-178451
Aug. 12, 2002  (JP)  .............................. 2002-235015

(51) Int. Cl.
*D01F 9/12*   (2006.01)
(52) U.S. Cl. ................ 423/447.3; 427/249.1; 977/843
(58) Field of Classification Search ............. 423/447.3; 977/843; 427/249.1
See application file for complete search history.

(56) References Cited

U.S. PATENT DOCUMENTS 4,627,160 A * 12/1986 Herron et al. ................. 29/830
6,350,488 B1 * 2/2002 Lee et al. ................. 427/249.1
6,465,132 B1 * 10/2002 Jin ........................... 429/231.8

* cited by examiner

*Primary Examiner*—Stuart Hendrickson
(74) *Attorney, Agent, or Firm*—Westerman, Hattori, Daniels & Adrian, LLP.

(57) ABSTRACT

The invention provides a process for production of carbon nanotubes whereby a laminate prepared by alternating lamination of a metal catalyst and a material other than the metal catalyst is cut to expose the laminated structure, and carbon nanotubes are grown on the metal catalyst at the cut surface of the laminate. The process results in high-quality carbon nanotubes, with minimized bundle growth, which are each individually and independently arranged in a highly precise manner at prescribed locations.

The invention also provides a carbon nanotube production process comprising a step of preparing a substrate which is inclined in one or two dimensions from a specific highly symmetrical crystal orientation and vapor depositing a metal catalyst along the atomic steps appearing on the surface of the substrate, and a step of growing the carbon nanotubes by chemical vapor deposition (CVD) using the metal catalyst as nuclei. It is thus possible to control the growth locations, diameters, orientation and chirality of carbon nanotubes.

31 Claims, 13 Drawing Sheets

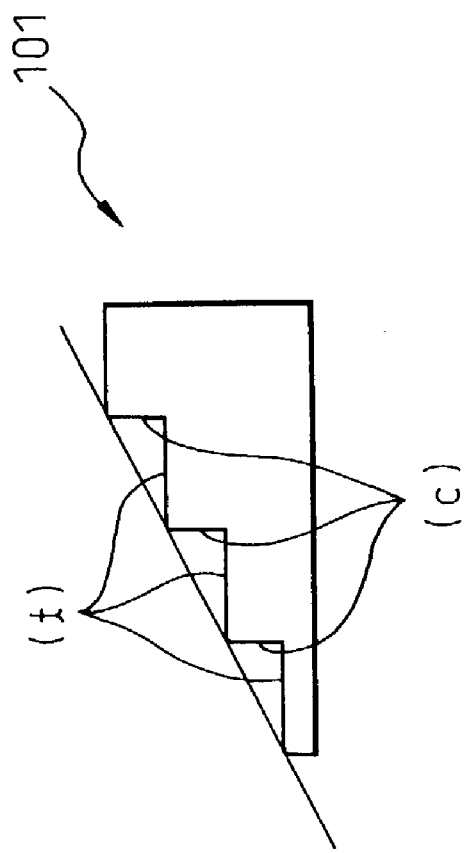
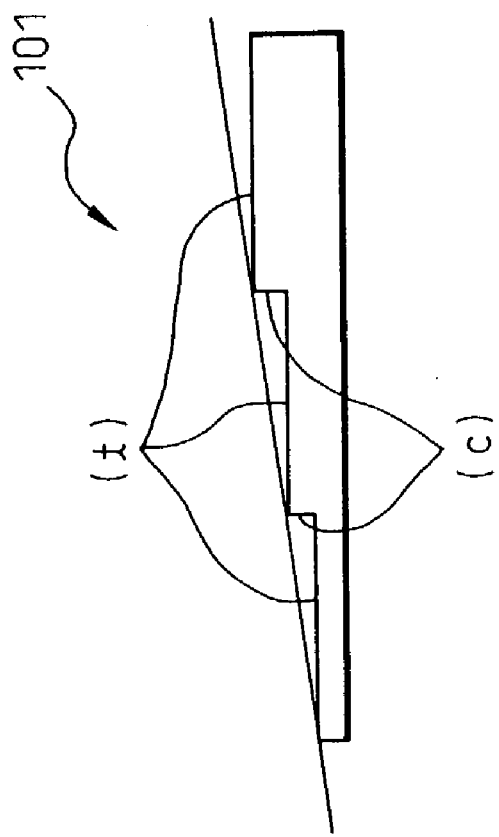

(t) (c)

(c)

(t)

101
102

(t) (c)

101

(c)

102

(t)

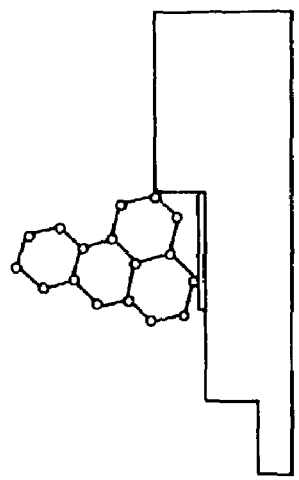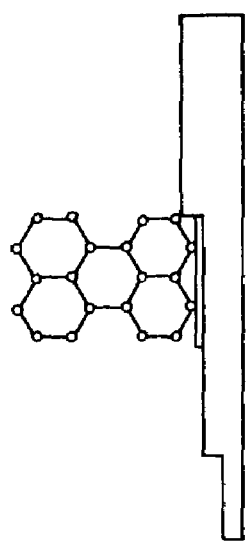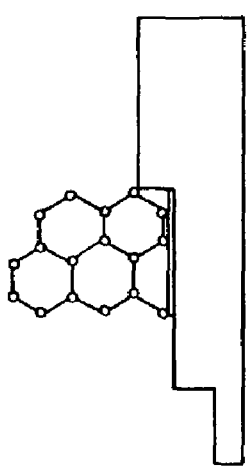

CARBON NANOTUBES, PROCESS FOR THEIR PRODUCTION, AND CATALYST FOR PRODUCTION OF CARBON NANOTUBES

CROSS-REFERENCE TO RELATED APPLICATIONS

This application is based upon and claims priority of Japanese Patent Applications Nos. 2002-178451 and 2002-235015 filed on Jun. 19, 2002 and Aug. 12, 2002, respectively, the contents being incorporated herein by reference.

BACKGROUND OF THE INVENTION

1. Field of the Invention

The present invention relates to a process for highly efficient production of carbon nanotubes with limited bundle growth and a highly precise arrangement, to high-quality carbon nanotubes, produced by said process, which are each individually and independently arranged in a highly precise manner at prescribed locations, and to a carbon nanotube production catalyst which is suitable for production of said carbon nanotubes.

The present invention also relates to a process for the production of carbon nanotubes on a substrate which is inclined from a highly symmetrical crystal orientation, or an "off-substrate".

2. Description of the Related Art

Carbon nanotubes exhibit a variety of superior properties such as chemical stability, metallic and semiconductor electric conductivity, high electron emission, high mechanical strength (high elastic modulus) and high thermal conductivity. It is expected that utilization of such properties will make possible applications in a wide range of fields including electric field emission electron elements, scanning probe microscope (SPM) probes, catalysts, structural reinforcing materials, battery electrodes, sensor materials and the like. Considerable research is therefore being conducted toward chiral control and growth location control of carbon nanotubes.

Carbon nanotubes represent a relatively new form of carbon material, and they have recently been the object of a great deal of interest because of their unique properties. Carbon nanotubes have a structure wherein graphene sheets consisting of 6-membered carbon rings, bonded by the strongest type of bond ($sp^2$), are rolled into a cylinder with the ends of the tubes closed by 5-membered rings interspersed between the 6-membered rings. The tube diameter can be reduced to the subnanometer order, with a minimum of 0.4 nanometer. Carbon nanotubes are also known to have various additional properties such as high current density ($10^9$ amperes per square centimeter) and ballistic conductivity, as well as high thermal conductivity and high mechanical strength, all combined with the advantage of their nanometer-scale diameter. FIGS. 14(a)-(c) are schematic representations of the different chiralities of carbon nanotubes. Carbon nanotubes exhibit semiconductor or metallic conductivity depending on the helical structure (the twist, or "chirality") of the graphite. FIG. 14(a) is known as the "armchair type", which exhibits metallic conductivity, FIG. 14(b) is known as the "zigzag type", which exhibits semiconductor conductivity, and FIG. 14(c) is known as the "chiral type", which exhibits conductivity between metallic and semiconductor. Application of such materials to electronic devices requires techniques for growing nanotubes with prescribed properties (chirality), having the prescribed orientation and at prescribed locations.

As processes for growing carbon nanotubes there may be mentioned arc discharge, laser vaporization, thermal CVD and plasma CVD. These processes can produce Single Wall Carbon Nanotubes (SWNTs) composed of a single graphene sheet and Multi Wall Carbon Nanotubes (MWNTs) composed of multiple graphene sheets. All of the processes require a metal catalyst (Fe, Co, Ni) for growth of the carbon nanotubes.

Growth of carbon nanotubes having a consistent orientation at prescribed locations is being investigated. Control of the location of growth of carbon nanotubes is accomplished primarily by arranging the metal catalyst at the prescribed location. In thermal CVD or plasma CVD, for example, the metal catalyst is pre-patterned onto a substrate, and an oriented electric field is applied to grow the carbon nanotubes in a consistent orientation at the prescribed locations.

While patterning of the metal catalyst in this manner can grow carbon nanotubes with a consistent orientation at the prescribed locations, the currently employed patterning methods only allow the metal catalyst patterns to be separated at sizes on the order of a few micrometers to a few hundred nanometers. Consequently, as shown in FIG. 15, numerous carbon nanotubes 3 with a diameter of from a few to a few hundred nanometers grow in a disordered fashion on each pattern of the metal catalyst 2 on the substrate 1, and often the carbon nanotubes grow in bundles with the molecules bonded together by van der Waals forces. It has been difficult by existing techniques to separate each of the individual carbon nanotubes which have grown in such bundles, and therefore the inability to use each of the individual carbon tubes has been a drawback.

The fluctuation in patterns resulting from lithography has constituted a problem in that it results in fluctuations in the border regions of nanotube growth. No success has yet been achieved in controlling chirality, and the development of a suitable method is desired.

The present invention overcomes these problems of the prior art and achieves the objects stated below. Specifically, it is an object of the invention to provide a process for production of carbon nanotubes with limited bundle growth and being independently arranged in a highly precise manner at prescribed locations, as well as high-quality carbon nanotubes produced by said process which are each individually and independently arranged in a highly precise manner at prescribed locations, and a carbon nanotube production catalyst which is suitable for production of said carbon nanotubes.

As explained above, no production process has yet been developed for carbon nanotubes having controlled growth location, diameter, orientation and chirality. It is therefore another object of the present invention to provide a production process for carbon nanotubes having controlled growth location, diameter, orientation and chirality.

SUMMARY OF THE INVENTION

As a result of diligent research by the present inventors for the purpose of solving the problems mentioned above, the following discovery has been made. Specifically, it has been found that, in order to obtain carbon nanotubes which have no bundle growth and are independently arranged in a highly precise manner, it is necessary to control the size of the metal catalyst pattern to approximately the diameter of the carbon nanotubes, and to arrange it at the prescribed location.

According to a first mode of the invention, there is provided a carbon nanotube production process characterized in that a laminate prepared by alternating lamination of a metal catalyst and a material other than the metal catalyst is cut to expose the laminated structure, and the carbon nanotubes are grown on the metal catalyst at the cut surface of the laminate.

According to the carbon nanotube production process of the invention, the laminate prepared by alternating lamination of a metal catalyst and a material other than the metal catalyst is cut to expose the laminated structure. The carbon nanotubes are then grown on the metal catalyst at the cut surface of the laminate. By using the cut surface as the growth surface for the carbon nanotubes, bundled growth of carbon nanotubes is prevented and high-quality carbon nanotubes are efficiently produced, each being individually and independently arranged in a highly precise arrangement.

Carbon nanotubes of the invention are obtained by the aforementioned carbon nanotube production process of the invention. Therefore, the carbon nanotubes of the invention, being obtained as high-quality nanotubes with no bundle growth and each individually and independently arranged in a highly precise manner at prescribed locations, may be utilized in a wide range of fields including electric field emission electron elements, scanning probe microscope (SPM) probes, catalysts, structural reinforcing materials, battery electrodes, sensor materials and the like.

According to a second mode of the invention, there is provided a carbon nanotube production process comprising a step of preparing a substrate which is inclined in one or two dimensions from a specific highly symmetrical crystal orientation, and vapor depositing a metal catalyst along the atomic steps appearing on the surface of the substrate, and a step of growing the carbon nanotubes by chemical vapor deposition (CVD) using the metal catalyst as nuclei.

In this process, it is possible to control the diameter, orientation and chirality of the carbon nanotubes by controlling the type of substrate and the direction of inclination and degree of inclination of the substrate, as well as the amount and regions of the metal catalyst, during production of the carbon nanotubes on the substrate.

BRIEF DESCRIPTION OF THE DRAWINGS

FIGS. 5(a) and (b) are a pair of schematic diagrams showing the relationship between atomic steps and inclination from the crystal orientation.

FIGS. 10(a)-(c) are a set of diagrams showing the relationship between the height of step cliffs and the locations of carbon atoms of carbon nanotubes.

DETAILED DESCRIPTION OF THE PREFERRED EMBODIMENTS

Figure 1A:
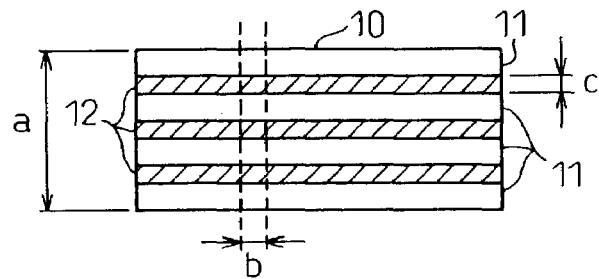
FIGS. 1(a)-(d) are a set of simplified illustrations showing the steps in an example of the carbon nanotube production process of the invention.

The first and second modes of the present invention will now be explained in detail.

Carbon nanotubes, production process and carbon nanotube production catalyst, according to the first mode The carbon nanotubes of the invention are obtained by the carbon nanotube production process of the invention.

In the carbon nanotube production process of the invention, a laminate prepared by alternating laminations of a metal catalyst and a material other than the metal catalyst is cut to expose the laminated structure, and the carbon nanotubes are grown on the metal catalyst at the cut surface of the laminate. The carbon nanotube production catalyst of the invention is provided by cutting the laminate so that the laminated structure is exposed.

The details regarding the carbon nanotubes and carbon nanotube production catalyst according to the invention will become more apparent from the following explanation of the carbon nanotube production process of the invention.

The aforementioned laminate is prepared by alternating laminations of a metal catalyst and a material other than the metal catalyst.

There are no particular restrictions on the metal catalyst so long as it is capable of catalyzing the growth of carbon nanotubes, and it may be selected as appropriate depending on the purpose, but transition metals and transition metal compounds are preferred.

Transition metals may be selected as appropriate depending on the purpose, with no particular restrictions, and as examples there may be mentioned Al, Ti, V, Cr, Mn, Fe, Ni, Co, Cu, Zn, Zr, Mo, Ru, Rh, Pd, Ag, Cd, In, Sn, Sb, W, Re, Os, Ir, Pt and alloys containing these metal elements. Any of these may be used alone or in combinations of two or more. Fe, Co and Ni are preferred from the standpoint of high catalyst activity.

Transition metal compounds may also be selected as appropriate depending on the purpose, with no particular restrictions, and as examples there may be mentioned oxides, halides, hydroxides, sulfates, nitrates, etc. of the aforementioned transition metals. These may be used alone, or in combinations of two or more.

The layer thickness of the metal catalyst in the laminate is preferably from a few nanometers to a few dozen nanometers, is similar to the diameters of carbon nanotubes, and is more preferably 0.4-20 nm.

The metal catalyst in the laminate may be laminated by a known vapor deposition method, sputtering method, or the like, and such methods may be used to easily adjust the layer thickness from a few nanometers to a few tens of nanometers, similar to the diameter of the carbon nanotubes.

There are no particular restrictions on the material other than the metal catalyst so long as it can form a film alternately with the metal catalyst to produce a laminate, and it may be selected as appropriate depending on the purpose. As examples there may be mentioned $SiO_2$, $Si_3N_4$, SiC, BN, SiON, $Al_2O_3$, $TiO_2$ and the like. Any of these may be used alone or in combinations of two or more.

There are no particular restrictions on the layer thickness of the material other than the metal catalyst in the laminate, and it may be appropriately selected depending on the purpose, but it is preferably, for example, 1-20,000 nm, and more preferably 200-1000 nm.

The material other than the metal catalyst in the laminate may be laminated by a known vapor deposition method, sputtering method, or the like, and such methods may be used to easily adjust the layer thickness to within the desired range.

When the laminate is formed on a substrate, that is, when the metal catalyst and the material other than the metal catalyst are alternately formed as a laminate on the substrate, the material other than the metal catalyst may be the same material as that of the substrate.

There are no particular restrictions on the material of the substrate and it may be selected as appropriate depending on the purpose, but as preferred examples there may be mentioned silicon (Si) substrates, glass substrates, quartz substrates, alumina substrates, porous silica substrates, alumina anodized plates, and the like.

Preferably, the substrate surface is thoroughly cleaned before use, and the method employed to clean the substrate is preferably solvent cleaning, or discharge treatment such as corona treatment, plasma treatment, plasma incineration, or the like. The cleaning effect may also be increased by combining several cleaning methods.

No particular restrictions are placed on the number of alternate laminations of the metal catalyst and the material other than the metal catalyst in the laminate, and it may be selected as appropriate for the purpose, but preferably one or more layers, and particularly 1-3 layers of each of the metal catalyst and the material other than the metal catalyst are formed in the laminate.

The cutting must be carried out in such a manner that the laminated structure of the laminate is exposed. As preferred examples there may be mentioned the following. As a first example, a cut piece is formed having an "alternately arranged cut surface" with the metal catalyst and the material other than the metal catalyst in a one-dimensional alternate arrangement parallel to the direction of lamination of the laminate. As a second example a cut piece is formed having an alternately arranged cut surface with the metal catalyst and the material other than the metal catalyst in a one-dimensional alternate arrangement inclined with respect to the direction of lamination of the laminate. As a third example one laminate is cut in such a manner that the shape of the cross-section parallel to the direction of lamination of the laminate is in the approximate shape of a V, so that the two exposed alternately arranged cut surfaces each with the metal catalyst and the material other than the metal catalyst in an alternately arranged one-dimensional structure are opposed to each other.

According to the first and second examples, the growth of the carbon nanotubes may be accomplished by placing the cut pieces on the substrate. The cut piece will have two sides, a front and back side, with alternately arranged cut surfaces.

According to the first, second and third examples, the alternately arranged cut surface is preferably patterned in the direction of arrangement of the metal catalyst and the material other than the metal catalyst, and in the direction orthogonal to the arrangement, to form a tessellate cut surface with the metal catalyst arranged in a tessellate form. This will allow the metal catalyst to be regularly arranged not just in one dimension but in two dimensions for more effective control of bundle formation, which is more advantageous from the standpoint of obtaining high-quality carbon nanotubes with consistent diameters and each individually and independently arranged in a highly precise manner.

The method of patterning is not particularly restricted and may be appropriately selected depending on the purpose, and as preferred examples there may be mentioned methods of coating a known resist material on the alternately arranged cut surface, and patterning it by lithography.

The cut piece of the laminate obtained in this manner serves as the carbon nanotube production catalyst of the invention.

According to the invention, the carbon nanotubes are grown on the metal catalyst at the alternately arranged cut surface and, therefore, the metal catalyst layer thickness (layer width, exposed width or exposed area) corresponds directly to the diameters of the carbon nanotubes to be grown. Thus, by appropriately altering the cutting angle it is possible to adjust the layer thickness (layer width) of the metal catalyst on the alternately arranged cut surface, thereby allowing adjustment of the diameters of the carbon nanotubes.

The cutting angle is not particularly restricted and may be appropriately selected depending on the purpose, but it is preferably 30-60° with respect to the direction of lamination of the laminate.

The cutting method is also not particularly restricted and may be appropriately selected depending on the purpose, and for example, there may be mentioned laser cutting, FIB (focused ion beam) cutting and the like.

The carbon nanotube growth is carried out on the metal catalyst, and it is preferably accomplished with two mutually opposing alternately arranged cut surfaces and an electric field applied between and directed against the alternately arranged cut surfaces.

The process for growing the carbon nanotubes is not particularly restricted and may be appropriately selected from known processes depending on the purpose, but CVD (chemical vapor deposition) may be mentioned as a preferred one.

The CVD (chemical vapor deposition) process may be thermal CVD (also referred to simply as "CVD"), hot filament CVD, plasma enhanced CVD (also known as "plasma assisted CVD" or "plasma CVD"), plasma enhanced hot filament CVD, laser enhanced CVD (also known as "laser CVD"), and the like. Thermal CVD and plasma CVD are preferred among these processes.

Thermal CVD is conducted with a filament temperature of about 300-2000° C., with the filament heat accelerating decomposition of the source gas.

Plasma CVD ordinarily and preferably employs radio frequency (RF) for excitation of the plasma, but low frequency, microwaves (mW) or direct current (DC) may be used instead. Decomposition of the source gas is accelerated by the plasma. The output of plasma in case of radio frequency is about 0.1-1000 $W/cm^3$.

The conditions for growing carbon nanotubes by a CVD process are not particularly restricted and there may be appropriately applied the same conditions as for carbon nanotube production processes by ordinary CVD.

The flow rate of the source gas is preferably controlled, and the source gas used is preferably a mixture of a carbon supply gas and an introduced gas.

As examples of carbon supply gases there may be mentioned methane, ethylene, acetylene, benzene, butane, isopropanol, $C_{10}H_{16}$, $CS_2$, $C_{60}$ and the like. As examples of introduced gases there may be mentioned hydrogen, $NH_3$ and the like.

The mixing ratio for the mixed gas is not particularly restricted and may be appropriately selected depending on the purpose, and when using methane gas as the carbon supply gas and hydrogen gas as the introduced gas, the ratio is preferably methane gas:hydrogen gas=1-5:9-5 in terms of flow ratio.

The vacuum chamber pressure is preferably from 1-10 Torr, and more preferably 1-3 Torr.

The procedure described above yields carbon nanotubes according to the invention.

The carbon nanotubes of the invention may be single wall or multi wall nanotubes.

Single Wall Carbon Nanotubes (SWNTs) typically have diameters of about 0.4-3 nm and lengths of about 10 nm to 10 μm.

Multi Wall Carbon Nanotubes (MWNTs) typically have diameters of about 3-100 nm, lengths of about 10-nm to 10 μm and about 2-100 walls.

The carbon nanotube production process of the invention will now be explained in greater detail using concrete embodiments.

Figure 1B:
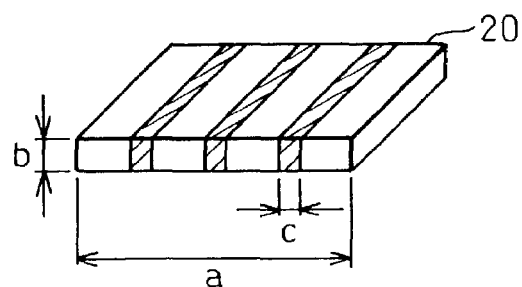
Figure 1C:
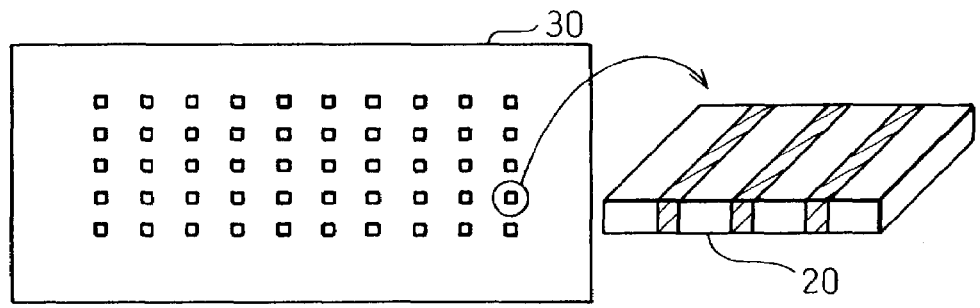
Figure 1D:
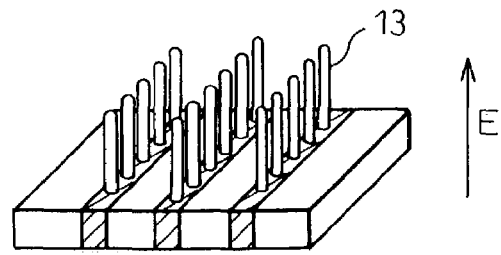

For example, as shown in FIG. 1(a) (lamination of one or more layers of the metal catalyst and material other than the metal catalyst), a laminate 10 obtained by alternately forming films of the metal catalyst 12 and the material other than the metal catalyst 11 is cut parallel to the direction of lamination of the laminate, and, as shown in FIG. 1(b) (cross-section parallel to the direction of lamination), a one-dimensionally arranged structure 20 (section) of the metal catalyst is cut to the prescribed thickness b. The thickness of the metal catalyst 12 may be approximately equivalent to the diameter of the desired carbon nanotubes and, for example, it may be a few nanometers. Next, as shown in FIG. 1(c) (where structures 20 are arranged at the prescribed positions on a substrate), structures 20 are arranged at the prescribed positions on a substrate 30 so that the cut surfaces of the one-dimensionally arranged structure 20 (section) are faced on the substrate 30. As shown in FIG. 1(d) (CNT growth along an electric field), an electric field is applied in the direction orthogonal to the one-dimensionally arranged structure 20 to grow carbon nanotubes 13.

Figure 2A:
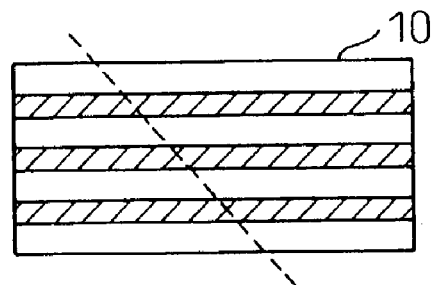
FIGS. 2(a)-(c) are a set of simplified illustrations showing the steps in an example of the carbon nanotube production process of the invention.
Figure 2B:
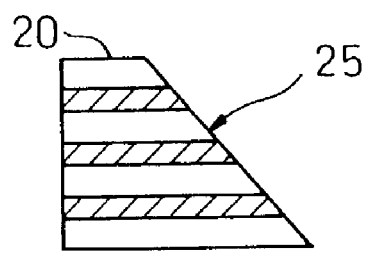
Figure 2C:
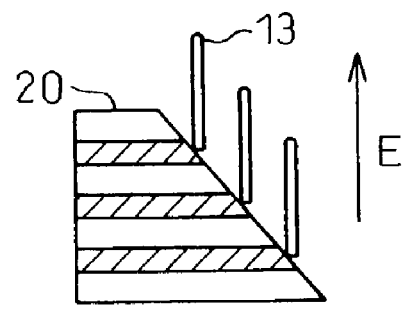

Also, as shown in FIGS. 2(a) and (b), the laminate 10 obtained by alternately forming films of the metal catalyst and the material other than the metal catalyst may be cut at a slant with respect to the direction of lamination and the obtained one-dimensionally arranged structure (cut section) 20 of the metal catalyst may be used directly. As shown in FIG. 2(c), the electric field may be applied in the direction orthogonal to the direction of lamination of the one-dimensionally arranged structure (cut section) 20 of the metal catalyst for growth of the carbon nanotubes 13 on the slanted cut surface 25.

Figure 3A:
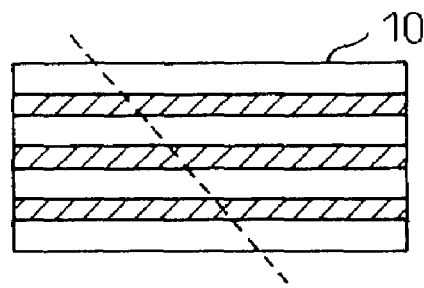
FIGS. 3(a)-(c) are a set of simplified illustrations showing the steps in an example of the carbon nanotube production process of the invention.
Figure 3B:
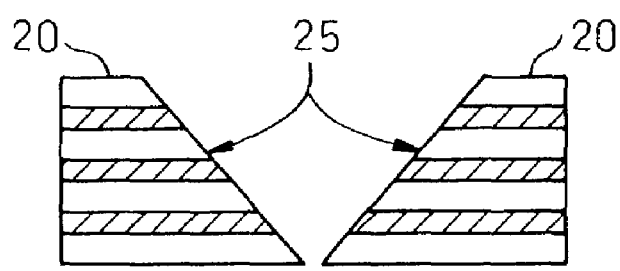
Figure 3C:
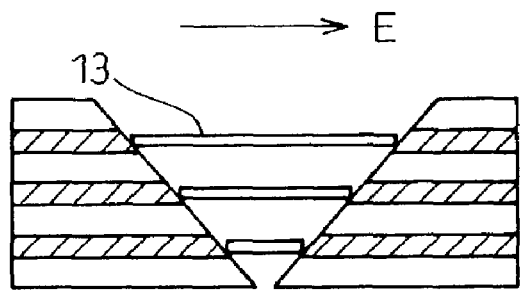

The laminate 10 obtained by alternately forming films of the metal catalyst and the material other than the metal catalyst may be cut at a slant with respect to the direction of lamination, in the manner shown in FIG. 3(a). However, as shown in FIG. 3(b), two of the one-dimensionally arranged structures (cut pieces) 20 of the metal catalyst may be positioned with the slanted cut surfaces 25 opposing each another. Then, as shown in FIG. 3(c), the electric field may be applied in the horizontal direction with respect to the laminate as a bridge between the slanted cut surfaces of the one-dimensionally arranged structures (cut pieces) 20, to accomplish growth of the carbon nanotubes 13.

The carbon nanotubes of the invention obtained by the carbon nanotube production process of the invention have a minimized bundle growth and are individually and independently arranged in a highly precise manner at prescribed locations. The carbon nanotubes of the invention may therefore be applied for a wide range of uses, including electronic materials such as field emission displays and fluorescent display lamps, energy materials such as fuel cells and lithium ion cells, composite materials such as reinforced plastics and antistatic materials, and nanotechnology materials such as nanodevices, probes for scanning probe microscopes (SPMs) and DNA chips.

Figure 4:
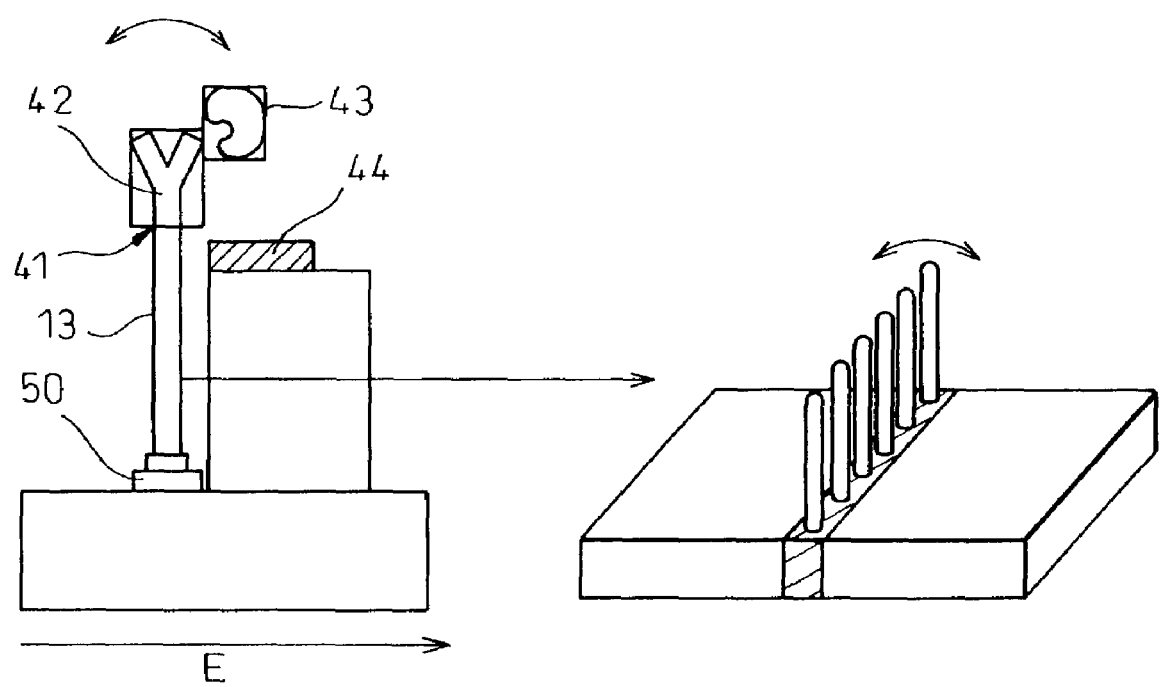
FIG. 4 is a pair of simplified perspective drawings showing an example of applying carbon nanotubes of the invention to a biopolymer detection apparatus.

A particularly advantageous use is illustrated in FIG. 4, as carbon nanotubes in a biopolymer detection device wherein a binding site capable of binding or interacting with a target biopolymer is attached at the end of each carbon nanotube. In FIG. 4, each carbon nanotube 13 is bonded to an electrode 50 while a chemical bond 41 is formed at the opposite end between the carbon nanotube and an antibody 42, and a target biopolymer 43 such as a protein may be bonded to the antibody 42. The biopolymer detection device shown in the illustration also comprises a detection electrode 44 which allows electrical detection of the bond with the target biopolymer 43. Thus, since the biopolymer detection device shown in FIG. 4 detects vibration fluctuations occurring upon bonding of the target biopolymer with the bonding sites (antibodies) at the ends of the carbon nanotubes which are individually and independently arranged in a highly precise manner at prescribed locations, it is possible to easily and reliably detect the target biopolymer in a sample for efficient disease diagnosis and the like.

The second mode of the invention will now be explained.

According to the second mode, a smooth substrate such as a silicon (Si) substrate, a compound semiconductor substrate such as alumina, quartz or gallium-arsenic (GaAs) substrate, or a ceramic substrate such as $SrTiO_3$, $NbGaO_3$, $Al_2O_3$, $LaAlO_3$, $(LaSr)_2AlTaO_3$, etc. is used as the substrate. Such a substrate must be on a plane slightly off from a highly symmetrical crystal orientation and is a so-called "off-substrate". Such substrates are cut out at a slight inclination from a specific highly symmetrical crystal orientation plane, such as the (001) plane, (011) plane or (111) plane, and will have atomic steps. As will be described in detail below, an atomic step is a step produced by a shift between the crystal orientation plane and the substrate plane.

Figure 6A:
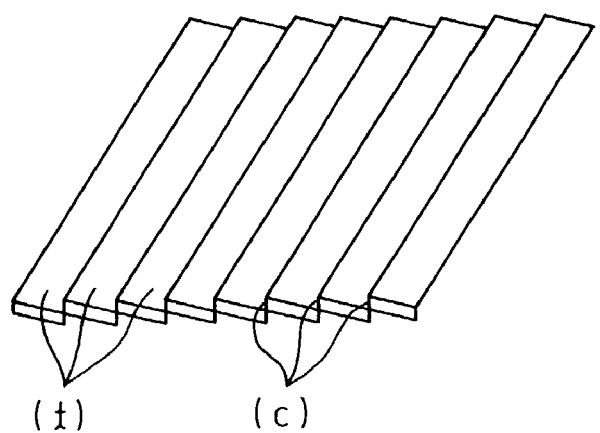
FIGS. 6(a) and (b) are a pair of schematic diagrams of an off-substrate.
Figure 6B:
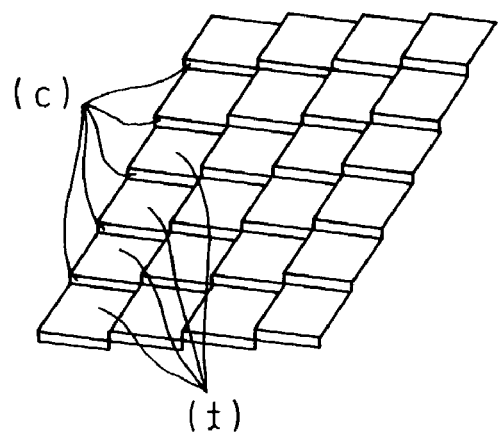

FIGS. 5(a) and (b) are schematic diagrams showing the relationship between atomic steps and inclination from crystal orientation. The atomic steps on the substrate 101 consist of cliffs (c) and terraces (t), and the heights of the cliffs (c) and widths of the terraces (t) of the atomic steps are determined by the angle of inclination. That is, as shown in FIG. 5(a), a smaller inclination from the crystal orientation plane results in a lower height of cliffs (c) and a larger width of terraces (t), while as shown in FIG. 5(b), a larger inclination from the crystal orientation plane results in a higher height of cliffs (c) and a smaller width of terraces (t). FIGS. 6(a) and (b) are schematic diagrams of an off-substrate. FIG. 6(a) is a schematic diagram of an off-substrate inclined in one dimension from a highly symmetrical crystal orientation, and FIG. 6(b) is a schematic diagram of an off-substrate inclined two-dimensionally.

Figure 7A:
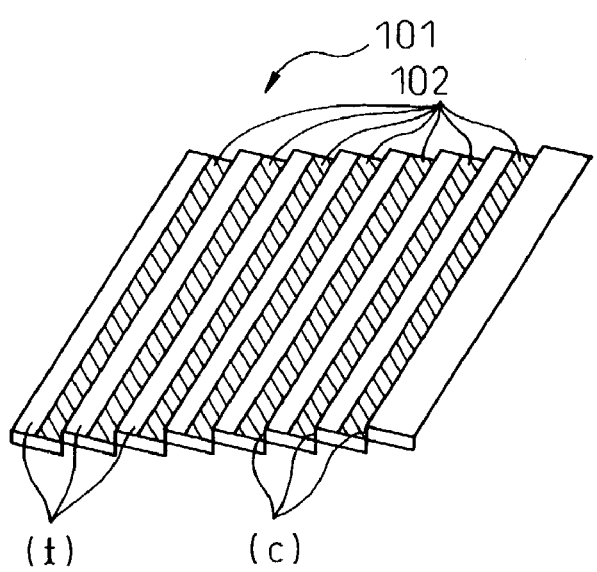
FIGS. 7(a) and (b) are a pair of schematic diagrams showing the arrangement of a metal catalyst vapor deposited on an off-substrate.
Figure 7B:
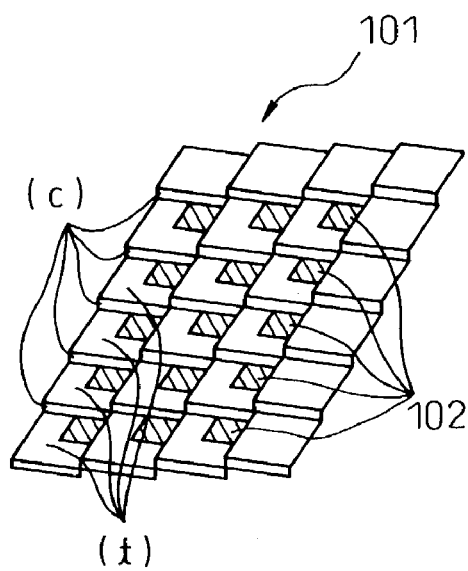

The steps for production of carbon nanotubes according to the second mode of the invention will now be explained in order. First, a metal catalyst suitable for carbon nanotube growth is vapor deposited on the substrate as described above. The metal catalyst used may be a transition metal such as iron, nickel, cobalt or palladium, or an alloy thereof, and the vapor deposition process used may be molecular beam epitaxy (MBE). The substrate is heated to a temperature (for example, 350-800° C.) at which the catalyst material sufficiently migrates by diffusion on the terraces, and the metal catalyst is supplied in an amount smaller than the amount necessary to cover all of the terraces, to cause hetero-crystal growth of the metal catalyst on the substrate only at the edges of the steps. The vapor deposition apparatus is usually operated with a vacuum pressure of 1E-7 Torr and a vapor deposition rate of 10 nm/min, using an electron beam vapor deposition source. This technique utilizes the nature of a step structure such as atomic steps on a substrate, whereby hetero-crystals grow from the sections of the steps of the substrate. Thus, with the substrate 101 inclined in one dimension from the specific highly symmetrical crystal orientation as shown in FIG. 6(a), it is possible to arrange the narrow linear metal catalyst 102 along the steps (see FIG. 7(a)). With the substrate 101 inclined two-dimensionally as shown in FIG. 6(b), it is possible to arrange zero-dimensionally grown islands of the metal catalyst 102 (see FIG. 7(b)). The sizes of the narrow line or island arrangements may be controlled by supplied amount of the catalyst material. A method of growing hetero-crystals using this type of off-substrate is disclosed, for example, in T. Fukui & H. Saito, "Step-flow Growth and Fractional-Layer Superlattices on GaAs Vicinal Surfaces by MOCVD", Journal of Crystal Growth 115 (1991), 61-64.

Figure 8:
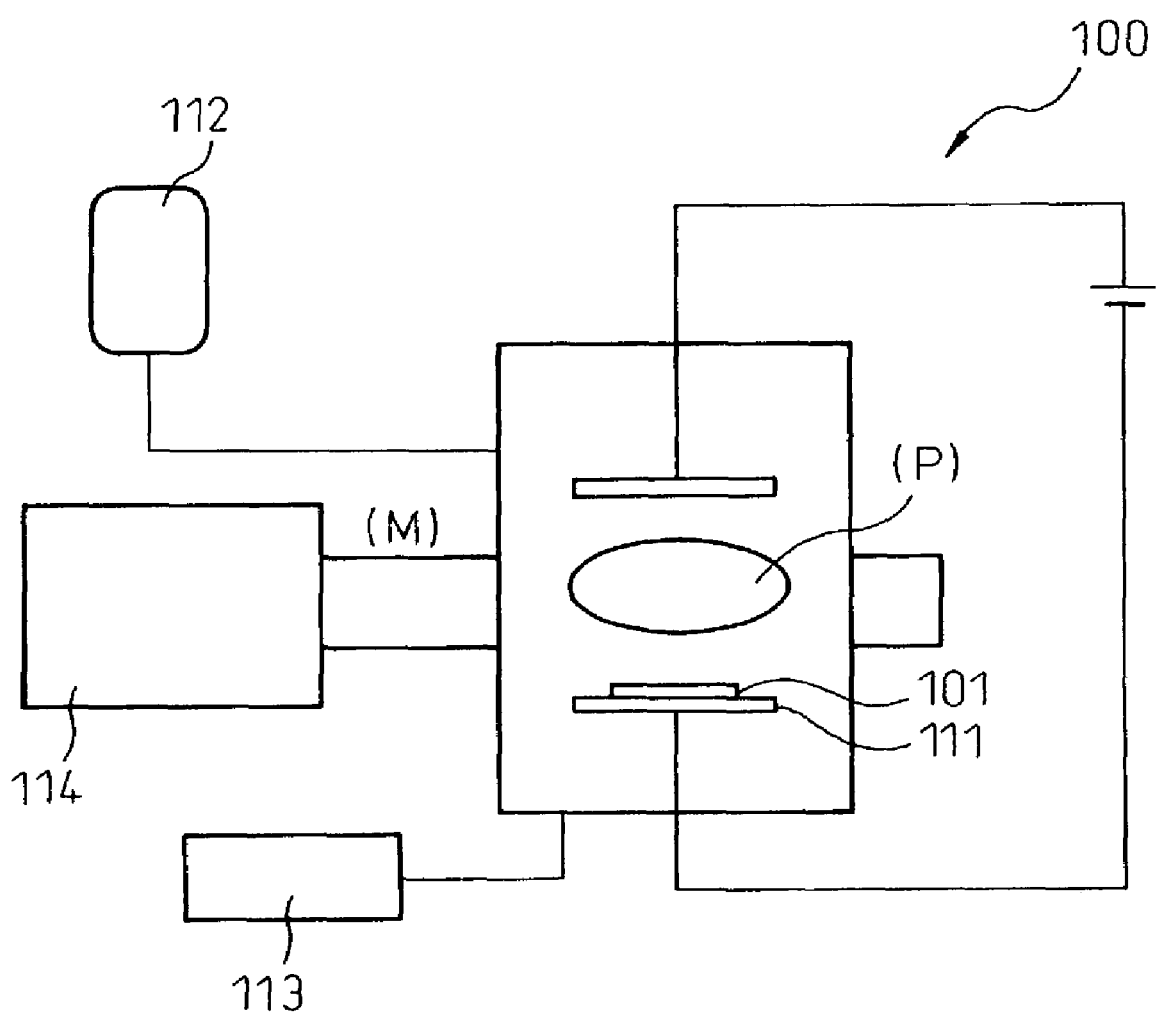
FIG. 8 is a schematic diagram of a plasma CVD apparatus.

Next, the carbon nanotubes are grown on the metal catalyst-deposited substrate. The carbon nanotube growth may be accomplished by a CVD process such as thermal CVD or plasma CVD. A method of carbon nanotube growth using plasma CVD will now be explained with reference to FIG. 8. A metal catalyst-deposited substrate 101 is set in a plasma CVD apparatus (reaction vessel) 100, and the temperature of the substrate 101 is raised to about 400-600° C. by a heating device 111. Plasma (P) of a reactive gas is generated from a reactive gas (carbon source) supplier 112 in the apparatus 100, and the plasma (P) is contacted with the substrate 101 to produce carbon nanotubes. The plasma (P) can be generated by holding the reactive gas-filled CVD apparatus 100 at a pressure of 1-10 Torr with a pump 113 and irradiating the interior of the CVD apparatus 100 with microwaves (M) from a microwave generating device 114 in the presence of an electric field. The frequency of the microwaves (M) will normally be 2.45 GHz, and the microwave output will be sufficient at about 0.5-6 kW. The voltage applied to the substrate 101 is 0-500 V, and is usually about 200 V.

As carbon sources there may be mentioned hydrocarbons such as methane, ethane, propane, butane, benzene, toluene, xylene, hexane, light oil or the like. The reactive gas used as the plasma generating source may also be a mixture of these gases with hydrogen, or a mixture containing a carrier such as argon. The supply rate of a reactive gas comprising a mixture of methane and hydrogen will normally be 60-90 sccm of hydrogen and 10-40 sccm of methane.

Figure 9A:
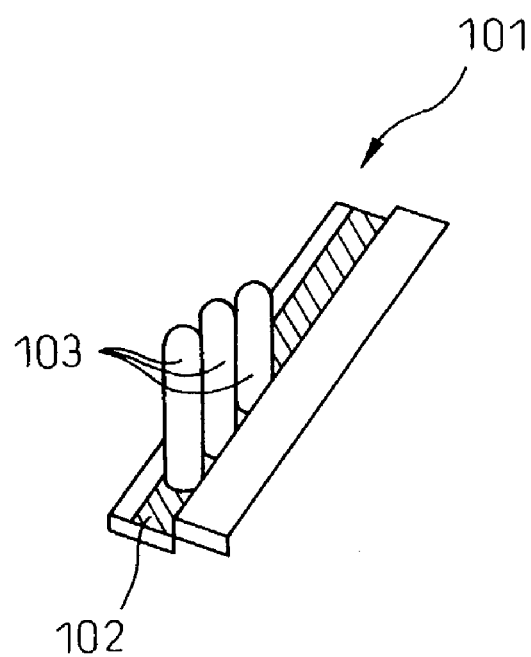
FIGS. 9(a) and (b) are a pair of schematic diagrams showing the state of growth of carbon nanotubes on a substrate.
Figure 9B:
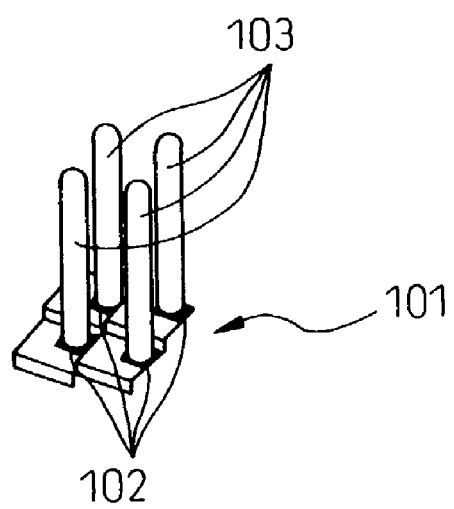

According to the process of the invention, the carbon nanotubes are grown using the metal catalyst on the substrate as nuclei. In the plasma CVD apparatus described above, the CVD is carried out in the presence of an electric field orthogonal to the substrate in order to grow the carbon nanotubes in an arrangement orthogonal to the substrate. FIGS. 9(a) and (b) are schematic diagrams showing the state of growth of carbon nanotubes on a substrate. In FIG. 9(a), the carbon nanotubes 103 are grown on a substrate 101 obtained by vapor depositing the metal catalyst 102 on a one-dimensionally inclined off-substrate. In FIG. 9(b), the carbon nanotubes 103 are grown on a substrate 101 obtained by vapor depositing the metal catalyst 102 on a two-dimensionally inclined off-substrate. Here, the diameters of the produced carbon nanotubes 103 may be controlled by the sizes of the regions of the metal catalyst 102 acting as the growth nuclei and, as mentioned above, the sizes may be controlled by the supplied amount of the metal catalyst during vapor deposition. The chirality of the carbon nanotubes may be controlled by adjusting the sizes of the metal catalyst regions and the heights of the cliffs of the steps, as will be explained below FIGS. 10(a)-(c) are diagrams showing the relationship between the heights of step cliffs and the locations of the carbon atoms of carbon nanotubes. Usually, when a three-dimensional structure such as a step structure is formed on a substrate, the three-dimensional regions typically serve as growth nuclei, preferentially to the flat regions, during crystal growth. Consequently, nanotube growth occurs with the carbon atoms contacting the corners formed by the cliffs and terraces of the steps. This property may be utilized to control nanotube chirality by controlling the heights of the step cliffs (that is, the inclination from a highly symmetrical crystal orientation), the sizes of the metal catalyst regions, or both. As seen in FIGS. 10(a) to (c), armchair type, zigzag type or chiral type chiralities can be obtained by different combinations of cliff heights and step widths. Carbon nanotubes having the armchair chirality exhibit metallic electric conductivity, and carbon nanotubes having the zigzag or chiral chiralities exhibit metallic or semiconductor electric conductivity, depending on the conditions.

EXAMPLES

Examples of the present invention will now be explained, with the understanding that they in no way limit the invention.

Example 1

A carbon nanotube production process according to Example 1 will now be explained with reference to FIG. 1.

First, a laminate 10 was obtained by alternately forming three layers each of iron and $SiO_2$ on a silicon substrate by vapor deposition. The obtained laminate 10 was cut, by laser cutting, parallel to the direction of lamination of the laminate, to fabricate a one-dimensionally arranged structure 20 (cut piece) of the metal catalyst, having a 1.3 nm width. The obtained one-dimensionally arranged structure 20 was then positioned at a prescribed location on the silicon substrate 30 to expose the cut surface. Using plasma CVD, an electric field was applied in the direction orthogonal to the silicon substrate to grow carbon nanotubes.

Figure 11:
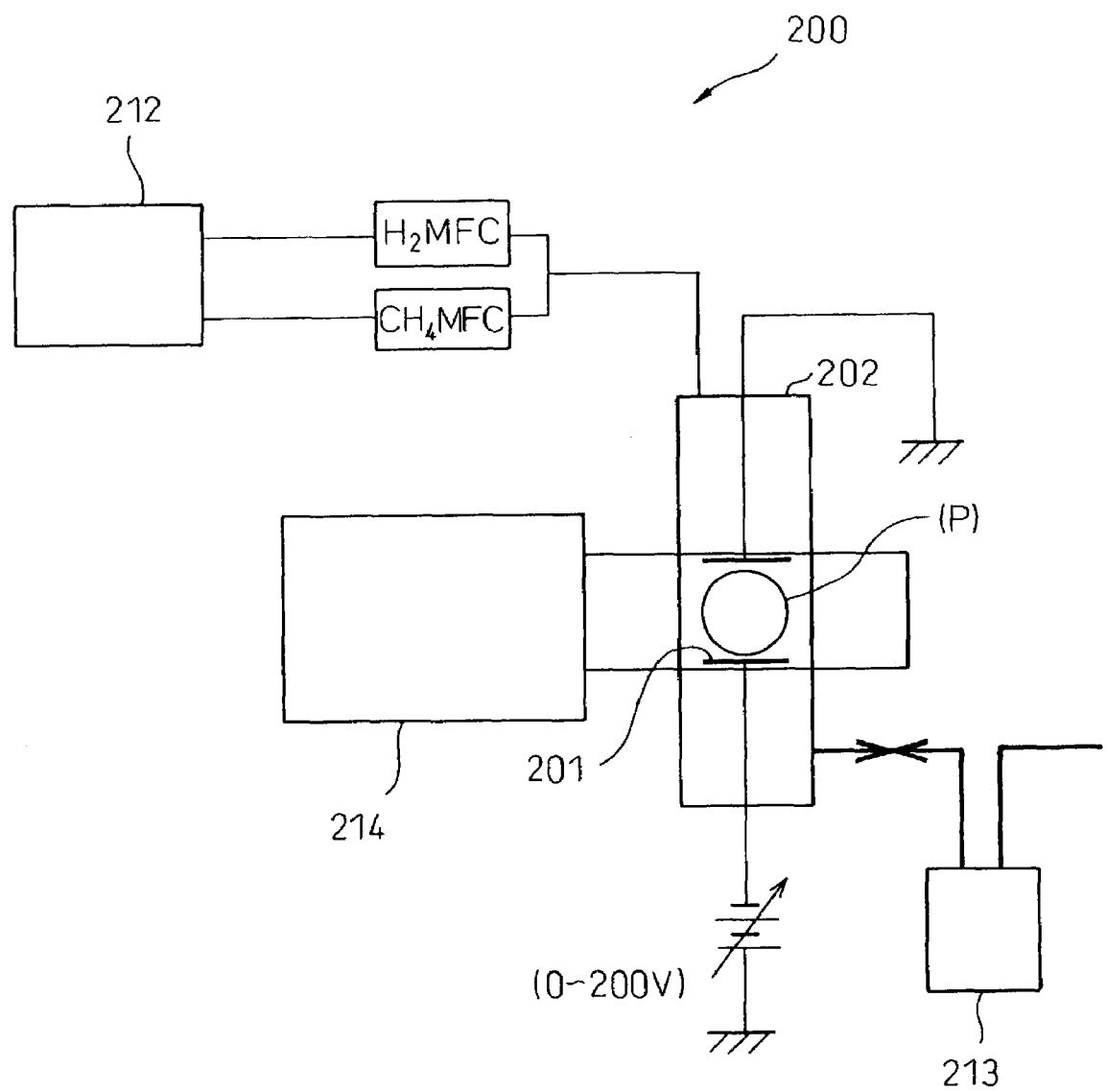
FIG. 11 is a simplified illustration showing an embodiment of the plasma CVD apparatus used in the examples.

The plasma CVD process was carried out using a plasma CVD apparatus 200 such as shown in FIG. 11, and a 2.45 GHz microwave source 214 as the excitation source, with the silicon substrate 201 situated in the vacuum chamber 202, and under conditions of 2 Torr pressure, $H_2$ flow rate/$CH_4$ flow rate=80 sccm/20 sccm, and application of a 160 V direct current bias to the substrate for 5-30 minutes of growth.

Figure 12:
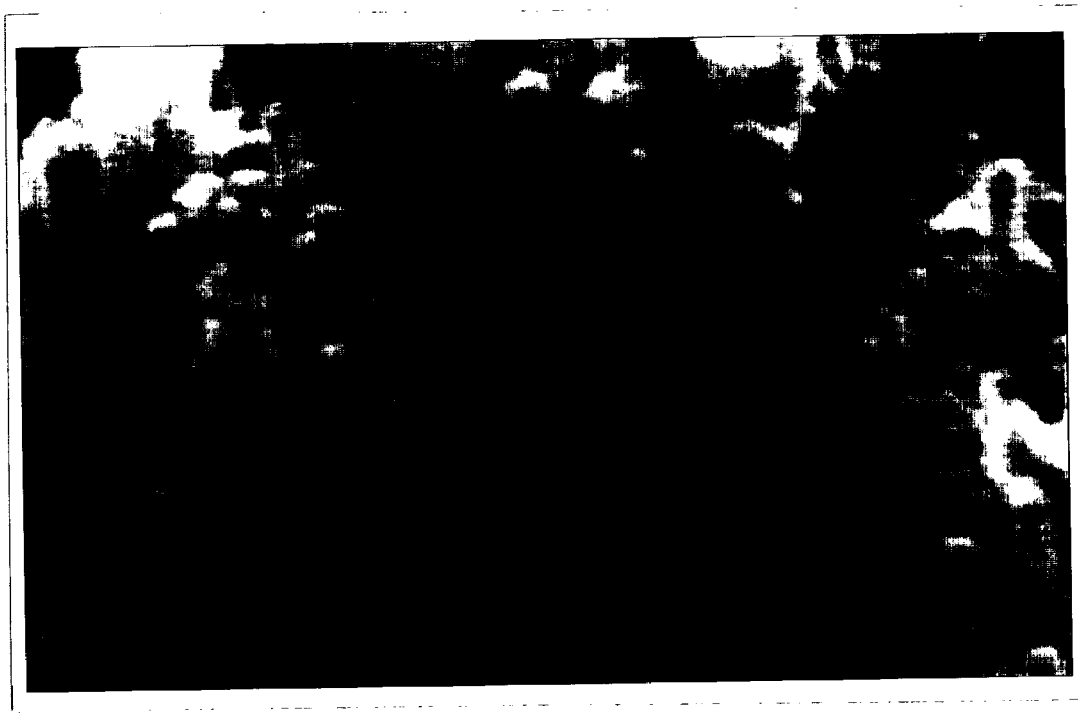
FIG. 12 is an SEM photograph showing the state of carbon nanotube formation in Example 1.

The condition of the formed carbon nanotubes was observed by scanning electron microscopy (SEM) and, as shown in FIG. 12, they were individually and independently fixed standing in a direction roughly orthogonal to the substrate, with no formation of bundles.

Comparative Example 1

Carbon nanotubes were grown in the same manner as Example 1, except that the carbon nanotube growth was accomplished on an iron coated film without using a laminate 10.

Figure 13:
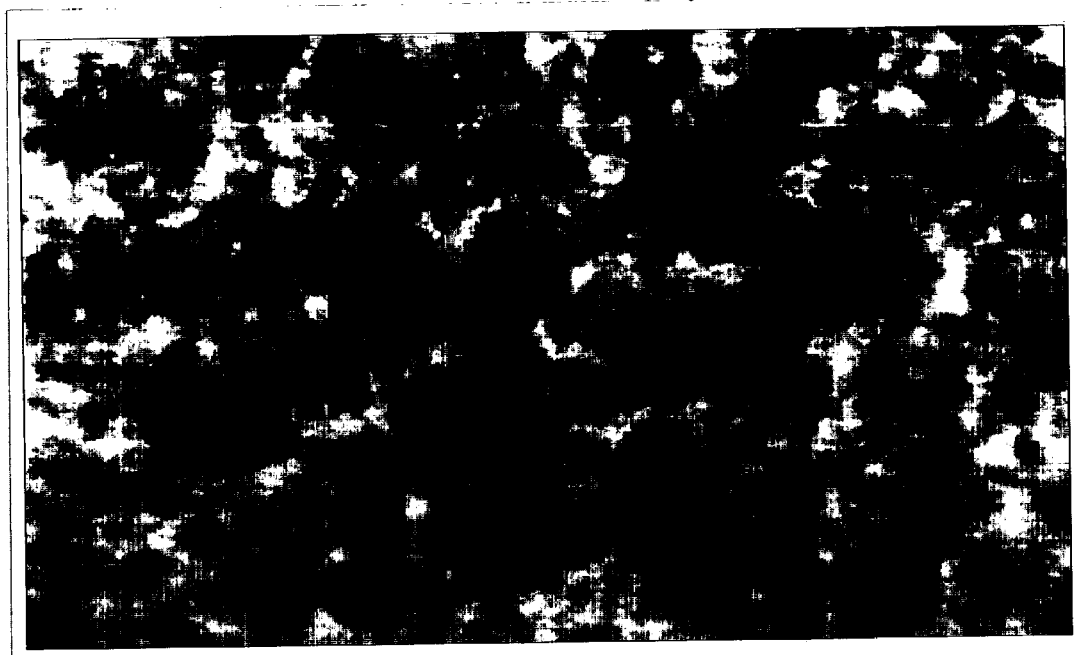
FIG. 13 is an SEM photograph showing the state of carbon nanotube formation in Comparative Example 1.
Figure 14C:
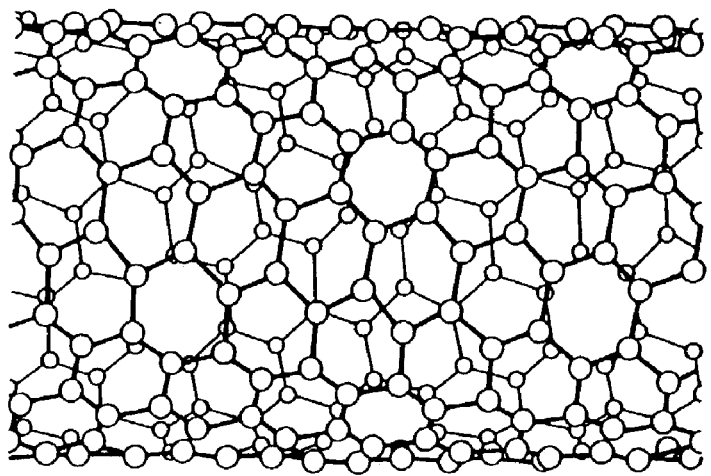
FIGS. 14(a)-(c) are a set of schematic diagrams showing the chiralities of carbon nanotubes.
Figure 14B:
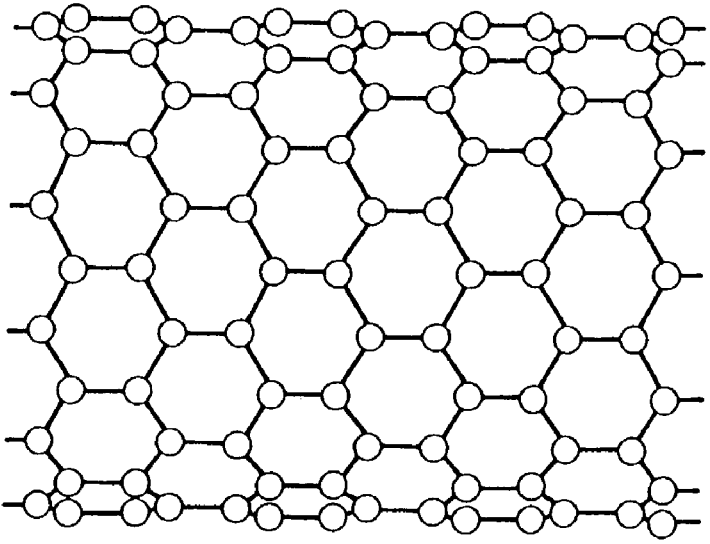
Figure 14A:
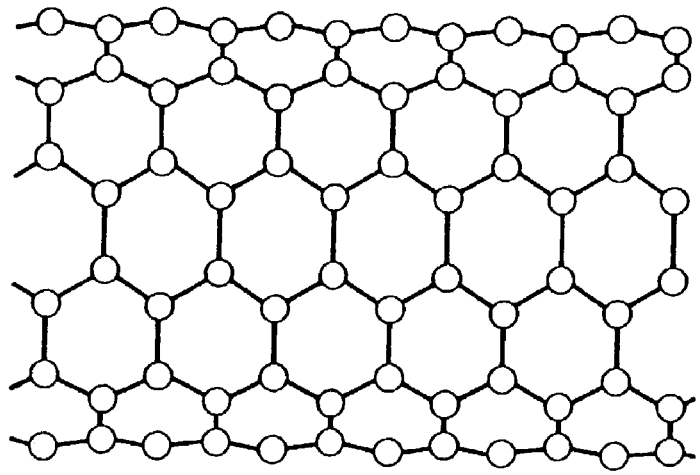
Figure 15:
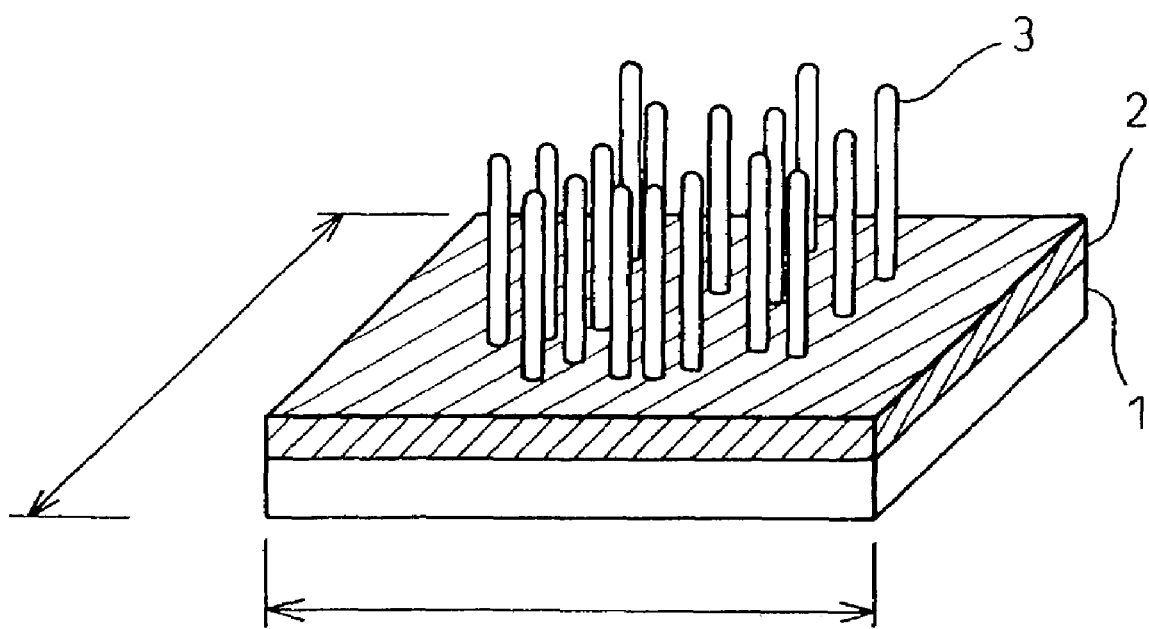
FIG. 15 is a simplified perspective drawing showing an example of a conventional carbon nanotube production process.

The condition of the formed carbon nanotubes was observed by scanning electron microscopy (SEM). As shown in FIG. 13, numerous carbon nanotubes had grown in a disorderly fashion, and bundled carbon nanotubes were apparent.

The present invention thus provides a process for highly efficient production of carbon nanotubes with limited bundle growth and a highly precise arrangement at prescribed locations, high-quality carbon nanotubes which are produced by the process and are each individually and independently arranged in a highly precise manner at prescribed locations, and a carbon nanotube production catalyst which is suitable for production of such carbon nanotubes, whereby the problems of the prior art described above may be overcome.

According to the invention, when producing carbon nanotubes on a substrate which is inclined in one or two dimensions from a specific highly symmetrical crystal orientation, it is possible to control the diameter, orientation and chirality of the carbon nanotubes by controlling the type of substrate and the direction of inclination and degree of inclination of the substrate, as well as the amount and the regions of the metal catalyst.

What is claimed is:

1. A carbon nanotube production process comprising:
   preparing a laminate by alternating lamination of a metal catalyst and a material other than the metal catalyst;
   cutting said laminate to expose the laminated structure, and
   growing carbon nanotubes on the metal catalyst at the cut surface of the laminate;
   wherein the cutting is accomplished with one laminate in such a manner that the shape of the cross-section parallel to the direction of lamination of the laminate is approximately in the shape of a V, so that the two exposed alternately arranged cut surfaces, each with the metal catalyst and the material other than the metal catalyst in an alternately arranged one-dimensional structure, are opposed to each other.

2. A carbon nanotube production process according to claim 1, wherein the cutting is accomplished in such a manner so as to form a cut piece having an alternately arranged cut surface with the metal catalyst and the material other than the metal catalyst in an alternately arranged one-dimensional structure which is parallel to the direction of lamination of the laminate.

3. A carbon nanotube production process according to claim 2, wherein the cut piece has alternately arranged cut surfaces with the metal catalyst and the material other than the metal catalyst in an alternately arranged one-dimensional structure which is parallel to the direction of lamination of the laminate on both the front and back side thereof, and the cut piece is positioned on a substrate.

4. A carbon nanotube production process according to claim 2, wherein two alternately arranged cut surfaces are mutually opposed and an electric field is applied between and directed against the alternately arranged cut surfaces for carbon nanotube growth.

5. A carbon nanotube production process according to claim 2, wherein the metal catalyst layer widths on the alternately arranged cut surface are adjusted by the angle of cutting.

6. A carbon nanotube production process according to claim 5, wherein the metal catalyst layer widths are from a few nanometers to a few tens of nanometers.

7. A carbon nanotube production process according to claim 2, wherein the metal catalyst layer widths on the alternately arranged cut surface are approximately equivalent to the diameters of the carbon nanotubes.

8. A carbon nanotube production process according to claim 2, wherein the alternately arranged cut surface is patterned in the direction of arrangement of the metal catalyst and the material other than the metal catalyst, and in the direction orthogonal to the arrangement, to form a tessellate cut surface with the metal catalyst arranged in a tessellate pattern, and the carbon nanotubes are grown on the metal catalyst at the tessellate cut surface.

9. A carbon nanotube production process according to claim 1, wherein the cutting is accomplished in such a manner so as to form a cut piece having an alternately arranged cut surface with the metal catalyst and the material other than the metal catalyst in an alternately arranged one-dimensional structure which is inclined with respect to the direction of lamination of the laminate.

10. A carbon nanotube production process according to claim 1, wherein an electric field is applied between and directed against the two alternately arranged cut surfaces for carbon nanotube growth.

11. A carbon nanotube production process according to claim 1, wherein the metal catalyst is selected from transition metals and transition metal compounds.

12. A carbon nanotube production process according to claim 11, wherein the transition metal is selected from Fe, Co and Ni.

13. A carbon nanotube production process according to claim 1, wherein the metal catalyst of the laminate is formed as a film by a process of vapor deposition or sputtering.

14. A carbon nanotube production process according to claim 1, wherein the material other than the metal catalyst in the laminate is formed as a film by a process of vapor deposition or sputtering.

15. A carbon nanotube production process according to claim 1, wherein the material other than the metal catalyst is selected from $SiO_2$, $Si_3N_4$, SiON, SiC, $Al_2O_3$, $TiO_2$ and BN.

16. A carbon nanotube production process according to claim 1, wherein the carbon nanotubes are grown by a CVD process.

17. A carbon nanotube production process according to claim 16, wherein the CVD process is selected from plasma CVD and thermal CVD.

18. A carbon nanotube production process comprising a step of preparing a substrate which is inclined in one direction from a specific symmetrical crystal orientation and vapor depositing a metal catalyst along the atomic steps appearing on the surface of the substrate, and a step of growing the carbon nanotubes by chemical vapor deposition (CVD) using the metal catalyst as nuclei.

19. A process according to claim 18, wherein the specific symmetrical crystal orientation is the (001) plane, (011) plane or (111) plane.

20. A process according to claim 18, wherein the carbon nanotubes are grown in such a manner that some of the carbon atoms of the carbon nanotubes are in contact with the terraces of the steps on the substrate surface and the corners of the steps.

21. A process according to claim 18, wherein the substrate is a silicon (Si) substrate, compound semiconductor substrate or ceramic substrate.

22. A process according to claim 18, wherein the metal catalyst is selected from the group consisting of transition metals of iron, nickel, cobalt and palladium, and alloys thereof.

23. A process according to claim 18, wherein the carbon nanotubes are grown in the presence of an electric field in the direction orthogonal to the substrate.

24. A process according to claim 18, wherein the chirality of the nanotubes is controlled by controlling the heights of the cliffs of the atomic steps on the substrate, the sizes of the metal catalyst regions, or both.

25. A carbon nanotube production process comprising a step of preparing a substrate which is inclined in two directions from a specific symmetrical crystal orientation and vapor depositing a metal catalyst along the atomic steps appearing on the surface of the substrate, and a step of growing the carbon nanotubes by chemical vapor deposition (CVD) using the metal catalyst as nuclei.

26. A process according to claim 25, wherein the specific symmetrical crystal orientation is the (001) plane, (011) plane or (111) plane.

27. A process according to claim 25, wherein the carbon nanotubes are grown in such a manner that some of the carbon atoms of the carbon nanotubes are in contact with the terraces of the steps on the substrate surface and the corners of the steps.

28. A process according to claim 25, wherein the substrate is a silicon (Si) substrate, compound semiconductor substrate, or ceramic substrate.

29. A process according to claim 25, wherein the metal catalyst is selected from the group consisting of transition metals of iron, nickel, cobalt and palladium, and alloys thereof.

30. A process according to claim 25, wherein the carbon nanotubes are grown in the presence of an electric field in the direction orthogonal to the substrate.

31. A process according to claim 25, wherein the chirality of the nanotubes is controlled by controlling the heights of the cliffs of the atomic steps on the substrate, the sizes of the metal catalyst regions, or both.

* * * * *